(12) United States Patent
Strand

(10) Patent No.: US 7,685,259 B2
(45) Date of Patent: Mar. 23, 2010

(54) LOCALLY RESPONSIVE KIOSK SIGNAGE FROM ON-LINE SOURCE

(75) Inventor: Michael J. Strand, 1529 Continental Dr., Eau Claire, WI (US) 54701

(73) Assignee: Michael J. Strand, Eau Claire, WI (US)

( * ) Notice: Subject to any disclaimer, the term of this patent is extended or adjusted under 35 U.S.C. 154(b) by 1025 days.

(21) Appl. No.: 11/361,611

(22) Filed: Feb. 24, 2006

(65) Prior Publication Data

US 2007/0204032 A1     Aug. 30, 2007

(51) Int. Cl.
  G06F 15/16     (2006.01)
  G06F 15/173    (2006.01)
  G06Q 10/00     (2006.01)
(52) U.S. Cl. .................. 709/219; 709/229; 709/240; 709/200; 705/1
(58) Field of Classification Search ................. 709/203, 709/217, 219, 224, 226, 228, 244, 229, 240, 709/200; 705/5, 10, 16, 20, 80, 411, 1; 725/1, 725/5, 37
See application file for complete search history.

(56) References Cited

U.S. PATENT DOCUMENTS

| | | | | |
|---|---|---|---|---|
| 6,529,940 | B1 * | 3/2003 | Humble | 709/204 |
| 6,571,279 | B1 * | 5/2003 | Herz et al. | 709/217 |
| 7,356,477 | B1 * | 4/2008 | Allan et al. | 705/1 |
| 2002/0038359 | A1 * | 3/2002 | Ihara et al. | 709/219 |
| 2002/0161664 | A1 | 10/2002 | Shaya et al. | 705/26 |
| 2005/0039206 | A1 | 2/2005 | Opdycke | 725/35 |
| 2005/0211768 | A1 | 9/2005 | Stillman | 235/381 |

OTHER PUBLICATIONS http://www.wirespring.com/dynamic_digital_signage_and_interactive_kiosks_journal/articles/Syndicating_content_to_your_kiosk_or_digital_sign_network-224.html.

* cited by examiner

*Primary Examiner*—Wing F Chan
*Assistant Examiner*—Nam Thai
(74) *Attorney, Agent, or Firm*—Mark A. Littman & Associates, P.A.

(57) ABSTRACT

Displayed content of signage at a distal location is at least partially controlled by a processor and database that directs signage display from a distal location. A central location processing system collects information on local, area wide, national or international conditions, events or changes in status and directs local signage to display appropriate information. The central location itself collects information, samples information, and evaluates general information to determine what specific information may be appropriately or desirably displayed at local signage. The display may be relevant to seasonal events such as holidays, sports events, actual changes in season, school year beginnings or endings, political events and the like, or independent events or conditions such as weather changes, severe weather, sales events, consumer alerts, public alerts, special event days. Information displayed locally can consider evaluation of local response to a range of potentially displayed information.

16 Claims, 3 Drawing Sheets

---

Central Provider System Accesses S Data

CP Gets Live/Periodic Feed of ΣS Data

Distal Customer (DC) Contracts with CP

DC Processor Linked to CP Processor

S Data Evaluated by CP re Contract Terms

CP Provides Contract Data Stream to DC

DC Receives Contract Data and Processes for Display

DC Local Display Shown as DC Directs

Potential feedback from Local Display changes priority or notifies customer in change of message performance

FIG. 2

ACME 1 Hour Discount ALL dresses

SMOG Alert East L.A. June 6-8

CA Angels at Anaheim win $7^{th}$ in row

Central HS $30^{th}$ Ann. Reunion call 555-5555

Recall of BrandX Medication Lot X-555-11

FIG. 3

| Central Provider System Accesses S Data |

| CP Gets Live/Periodic Feed of ΣS Data |

| Distal Customer (DC) Contracts with CP |

| DC Processor Linked to CP Processor |

| S Data Evaluated by CP re Contract Terms |

| CP Provides Contract Data Stream to DC |

| DC Receives Contract Data and Processes for Display |

| DC Local Display Shown as DC Directs |

| Potential feedback from Local Display changes priority or notifies customer in change of message performance |

LOCALLY RESPONSIVE KIOSK SIGNAGE FROM ON-LINE SOURCE

BACKGROUND OF THE INVENTION

1. Field of the Invention

The present invention relates to the field of signage or display of information on controlled display signs, the provision of an on-line system that may automatically change, adjust or initiate signage display with local content based upon analysis or detection of information that is of local or national content, and to methods and apparatus for effecting operation of the invention.

2. Background of the Art

Although the term "Internet" is used with great frequency in communications, there is a fundamental lack of understanding in the public about its nature and function. The term "Internet" commonly refers to the collection of networks and gateways that utilize protocols, such as the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the networks. Because of such wide-spread information sharing, remote networks such as the Internet have thus far generally evolved into an "open" system for which developers can design software applications for performing specialized operations or services, essentially without restriction.

Electronic information transferred between data-processing networks is usually presented in hypertext, a metaphor for presenting information in a manner in which text, images, sounds, and actions become linked together in a complex non-sequential web of associations that permit the user to "browse" or "navigate" through related topics, regardless of the presented order of the topics. These links are often established by both the author of a hypertext document and by the user, depending on the intent of the hypertext document. For example, traveling among links to the "Human Right" in an article displayed within a graphical user interface in a data-processing system might lead the user to the United Nations, biography of President Jimmy Carter, or the Neurenburg Trials, or to a reference to the Constitutions and Supreme Court or the International Court at the Hague. The term "hypertext" was coined in the 1960s to describe documents, as presented by a computer, that express the nonlinear structure of ideas, as opposed to the linear format of books, film, and speech.

A typical networked system that utilizes hypertext conventions follows a client/server architecture. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer (i.e., a server).

Client and server communicate with one another utilizing the functionality provided by Hypertext-Transfer Protocol (HTTP). The World Wide Web (WWW) or, simply, the "Web," includes those servers adhering to this standard (i.e., HTTP) which are accessible to clients via a computer or data-processing system network address such as a Uniform Resource Locator (URL). The network address can be referred to as a Universal Resource Locator address. For example, communication can be provided over a communications medium. In particular, the client and server may be coupled to one another via TCP/IP connections for high-capacity communication. Active within the client is a first process, known as a "browser," which establishes the connection with the server and presents information to the user. The server itself executes corresponding server software that presents information to the client in the form of HTTP responses. The HTTP responses correspond to "web pages" constructed from a Hypertext Markup Language (HTML), or other server-generated data. Each web page can also be referred to simply as a "page."

The client typically displays the information provided through the network by the server, using a software application known as a browser. Most browsers have modem graphical user interfaces that are capable of displaying and manipulating various types of data. A graphical user interface is a type of display format that enables a user to choose commands, start programs, and see lists of files and other options by pointing to pictorial representations (icons) and lists of menu items on the screen. Choices can be activated generally either with a keyboard or a mouse. Internet services are typically accessed by specifying a unique network address (i.e., typically with a URL). The URL address has two basic components, the protocol to be used and the object pathname. For example, the URL address, "http://www.uspto.gov" (i.e., home page for the U.S. Patent and Trademark Office), specifies a HTTP protocol and a pathname of the server ("www.uspto.gov"). The server name is associated with one or more equivalent TCP/IP addresses.

Neural Network Analysis

Neural network analysis is a method of modeling non-linear relationships between independent and dependent variables. The analysis is performed by creating a network that accurately models the relationship between the independent and dependent variables. Once a valid neural network is created it can be used to predict values of unknown, dependent variables on the basis of known, independent variables. By convention, in neural network analysis, independent variables are called inputs and dependent variables are called outputs.

The power of a neural network lies in the non-linear equation(s) that it uses to model the relationship(s) between the inputs and the outputs. The equation is a complex function that is defined by a set of variables called connection weights. Specific values for the connection weights are determined by a training algorithm which examines a set of training data. The training data is a set of inputs and associated outputs that are representative of the nonlinear relationship being modeled. The training algorithm processes the training data inputs and finds a set of connection weights that minimize the error between the predicted output of the neural network and the training data output.

A neural network is structurally comprised of an input layer, one or more hidden layers, and an output layer. The output and hidden layers are comprised of interconnected processing elements, which are the main building blocks of the neural network. The primary function of the input layer is to route input values to processing elements of the first hidden layer. Each processing element multiplies each input by a different connection weight value to obtain a product and then sums the individual products. The results are passed through a non-linear transfer function to produce a processing element output. All processing element outputs of one layer are routed to processing element inputs of the next layer where similar processing is repeated. The final layer in a neural network is the output layer and it may contain linear and/or non-linear processing elements. Non-linear processing elements process inputs in the same manner described above. Linear processing elements simply pass the input of the processing element to the output of the processing element. The outputs of the processing elements in the output layer produce the final output of the neural network.

Other neural network design considerations include whether the neural network is a fully connected and/or a feed-forward design. A neural network is fully connected if all outputs from one layer are used as inputs to the next layer. A neural network is feed-forward if there are no internal feedback loops (i.e. no outputs from one layer are used as inputs to a previous layer).

Although the Internet has been in general use for more than 15 years, it is only beginning to be used in ways that exploit its speed and information gathering capability in business processes.

Published U.S. Patent Application No. 20050211768 (Stillman) describes an interactive vending system(s) featuring product customization, multimedia, education and entertainment, with business opportunities, models, and methods. Individual or multiple-unit vending systems/kiosks with the ability to create highly customized products at the time of sale, with audio-visual features, handicap access and additional abilities and/or components; with multiple delivery abilities of tangible and/or intangible product(s); new real estate opportunities and business models, including business opportunities and/or jobs for disadvantaged people. This invention provides products for humans, animals and plants, and takes in one or more of the following product categories, without limitation: water, beverages, foodstuffs, toys, games contests, greeting cards, photography/video, audio/music, personal care products; using converging technologies such as, but not limited to: telecommunications, wireless data transmission, smart cards, etc. Benefits include, without limitation: test marketing, focus groups, and new product introductions using consumer interaction; education, entertainment, rewards, promotions, advertising, contests, charitable support, etc. This disclosure is singularly deficient in disclosure of hardware or software enabling practice of the technology. Outside the home, digital signage networks with numerous geographically disbursed digital displays (sometimes referred to as "narrow casting" systems) make the distribution and dissemination of dynamic content possible. Content can be programmed to change as a function of the part of the day (e.g., breakfast, morning, break time, lunchtime, afternoon, evening, onset of closing, etc.), day, desired current promotion, and anticipated viewing demographic by locale. These systems typically consist of a server which can be centrally programmed to control any of the displays to dynamically update the programming content.

Despite the above technical ability to precisely deliver content to a given place at a specified time, most implementations remain relatively untargeted with respect to messaging and audiences. One of the reasons for this, and a current drawback of these systems, is that the programming of digital signage today is largely a manual process. The user must explicitly program the signage network with the variations in content and scheduling that would result in a more targeted set of messages and delivery schedule. In other words, it takes a human to decide and know what message to deliver to a given location at a given time. This manual programming is complex and laborious in practice, and could involve a myriad of permutations of content, network, locale, and temporal variations. Thus, users program digital signage networks more like broadcast, where content treatments and schedules are applied to the overall system in very broad strokes. Therefore, it is currently impractical to use these systems to go from broadcast to 1: "a store audience" or 1:1 precision messaging of the kind that is commonly delivered to people on their PCs in their homes. Without a way to intelligently automate this programming, the potential for digital signage to become a truly targeted media is severely limited, if not lost entirely.

Another drawback with conventional digital signage networks is that they lack a direct, automated way to measure the relationship between viewer behavior and the content that is shown on digital signage networks. There have been private studies that attempt to quantify the overall effect of digital signage on sales in retail stores. However, digital signage and behavioral data (such as point of sale) come from completely disparate systems, and the processes in conducting these studies are manual-labor intensive, require specialized knowledge, get exponentially difficult to manage the more it is used, and are therefore expensive and cost prohibitive to conduct and maintain in perpetuity. Thus the ongoing efficacy of specific implementations of dynamic digital signage and messaging remains largely unknown. Furthermore, without a system that can measure quantitative results, users are unable to learn how to improve their overall implementations over time, unable to discern which specific content works best in given circumstances, when a message's impact is no longer beneficial, and therefore learn how to better target messages. Without a facility for measuring and learning, marketing on digital signage is just guesswork, rather than fulfilling the potential for targeted messaging to the right audience at the right time, adapting as world events and other outside circumstances impact buying and viewing patterns.

Some of these issues are at least partially addressed by Published U.S. Patent Application No. 20050039206 (Opdyke) that describes a system and method for delivering and optimizing media programming in public spaces. The system and corresponding methods for automating the execution, measurement, and optimization of in-store promotional digital media campaigns are provided. In one embodiment, a method in a computing system for deploying content to digital signage networks includes receiving from a user a marketing campaign goal and at least one optimization constraint suitable for generating a playlist. The method also includes generating a playlist designed to maximize a learning opportunity to achieve the marketing campaign goal. The method further includes provisioning the playlist to a point of presence on the digital signage network.

Published U.S. Patent Application No. 20020161664 (Shaya et al.) describes systems and methods of utilizing communications networks and multivariate analysis to predict or recommend optimal products from a predefined population of commercially available products are disclosed. The recommendations are based on intelligence contained in processing elements and subjective and/or objective product information received from consumers or input to the systems as part of their initial setup. The output of the systems comprise sets of products that they predict the consumer will prefer and/or perform well for the problem or concern identified by the consumer. The performance and preference predictions are a function of consumer problems and product responsiveness patterns. Objective product information is generally obtained with diagnostic instruments. Data measured with the diagnostic instruments may be communicated to the data processing portions of the invention via the Internet. The outputs of the data processing portion of the system may be presented to consumers via the Internet as well.

It is desirable to further use the capabilities of the Internet to provide business services from a distal location.

SUMMARY OF THE INVENTION

The displayed content of signage at a distal location is at least partially controlled by a processor and database that directs signage display from a distal location. A central location processing system collects information on local, area wide, national or international conditions, events or changes in status and directs local signage to display appropriate information. The central location itself collects information, samples information, and evaluates general information to determine what specific information may be appropriately or desirably displayed at local signage. The display may be relevant to seasonal events such as holidays, sports events, actual changes in season, school year beginnings or endings, political events and the like, or independent events or conditions such as weather changes, severe weather, school closings, sales events, consumer alerts, public alerts, special event days (such as Valentines' Day, Secretary's week, Bosses Day) and the like. Information displayed locally can consider evaluation of local response to a range of potentially displayed information, and the information display may be formatted and displayed according to expected local response.

BRIEF DESCRIPTION OF THE FIGURES

FIG. 2 shows a signage display with varying types of information thereon.

FIG. 3 shows a block diagram representing one format of a process for collecting, evaluating and displaying information on a kiosk.

DETAILED DESCRIPTION OF THE INVENTION

Figure 1:
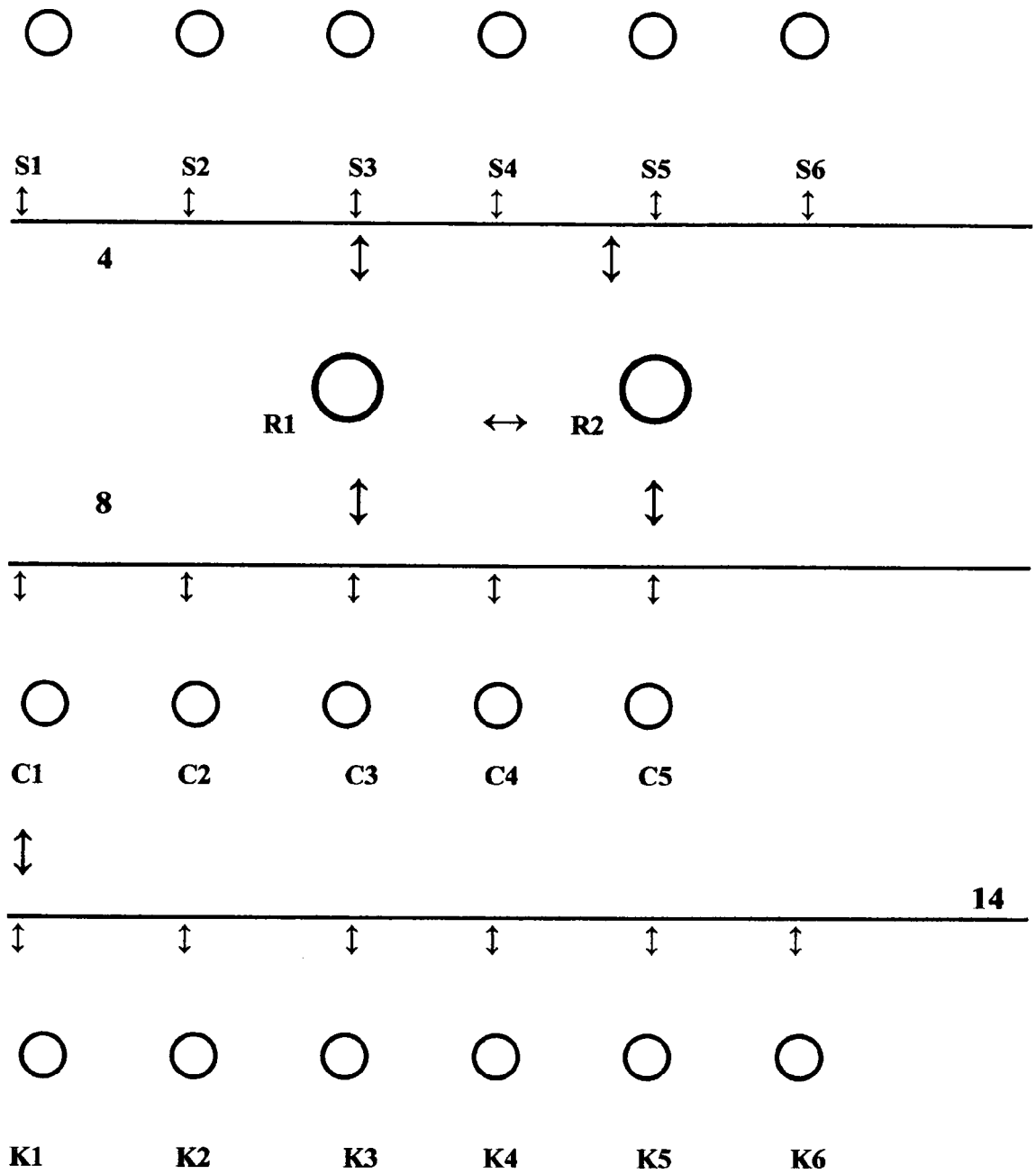
FIG. 1 shows a block diagram of one embodiment of a complete system for enabling central collection of data and distribution of data to local sources influencing or directing local signage display content.

Commercial applications of data transmitted to kiosks have been attempted in the past. For example, a "WireSpring Weblog & Learning Center" was described at the following website, and a complete copy of the published site disclosure is provided in the file wrapper of this patent.

http://www.wirespring.com/dynamic_digital_signage_and_interactive_kiosks_journal/art icles/Syndicating_content_to_your_kiosk_or_digital_sign_network-224.html This described a Resource Description Framework (RDF) that is a subscription from a single vendor, multiple vendors, or alternative/free sources of streaming information, RDF attempts to simplify the provision of the display by ensuring that data will arrive in a standard, accepted format. That way, instead of spending time deciphering, it will be directly displayed. The fact is, however, that it is little more than a uniform source of information that is displayed and is not unique to location, time, events and the like.

The RDF system has an open and fairly flexible standard with respect to how it is delivered to the "feed readers." There may be literally millions of computers that can gather the RDF feed just by subscribing to it. This is a system where information is entered once, and it is delivered to the masses, typically for free or with a subscription fee. As described in the article, there are many feed readers that people provide, including those built into many web browsers. The present technology described originally in the present Patent is also configured as a feed reader. Since it is open sourced, the information is not secure and is difficult to keep track of who has the information. It is also relatively clear that the RDF feeds are not customizable by the user on the server side. Essentially, the user uses a feed reader to subscribe to many "channels" of information which all show up on their feed reader whenever they start it. If the feed reader is running, the feed reader occasionally goes to all the subscriptions to see if there is any new content. If there is new content, it appears as a new link that the customer can click onto and display. This access is user controlled and would require personnel screening and selecting the displayed content.

Among the differences between the RDF system and the technology originally described herein are at least one of the following:

1) The present system may be a proprietary information stream that keeps the customer's information private. Although it is not necessary to encrypt the customer's information, it could and maybe should be encrypted.

2) The present system controls the delivery and the receiving program since the receiving program which is used on the client's computer is downloaded from our site. (in the future, other people may create the program using our specification)

3) The present system may auto-update that remote player with or without intervention from the user.

4) Version number information may allow the server to talk "in the right language" to the remote client no matter what version it is running.

5) The present system is typically used for delivering specific content from one server system to one or two directly accessed "customer" computers.

6) The present system may provide a check for new information each time the page auto advances and a new page is displayed (typically between 5 and 30 seconds). This is directly accessed by an initial request of the client (much like the RDF feed is) with the proper login information.

7) The present system is designed to be user configured as opposed to a universal, generic feed.

8) The present system also may have a single data stream that goes to the "customer" computers rather than many subscriptions that need to be set up.

9) The customer specifies which content is delivered to the remote computer and the communication protocol takes care of sending the right messages to the right computer.

10) Depending on the configuration, starting the system and initiating the data stream can be as simple as a single click of a link from an existing computer at a customer site and relay of the information from the customer computer to the various display screens.

These are significant technical and process advancements that can be provided by the present system.

The assignee has also offered school signage to the public at a website, http://www.strandvision.com/?schools. This type of display is generally known as dynamic signage, electronic signage, multi-media merchandising or narrowcasting, networks of digital signs are an exciting and technologically oriented way for schools and colleges to communicate with facility and staff. The digital signage software provides a technologically oriented way to display important school information and provide communication points throughout the institution. This tends to be a locally controlled (school site) computer providing signage information in the school environment.

In one embodiment shown in FIG. 1, the various sources of information $S_1$, $S_2$, $S_3$, $S_4$, $S_5$, $S_6$ (e.g., and up to $S_n$) are connected (shown by two-way communication arrows) to a central processor (shown as two processor R1 R2) of the system. The central processor may actually consist of several processors (servers) in different physical locations that utilize the Internet to perform a portion of the central processor functions (shown as two way arrows). All of these servers are directly or indirectly controlled by one main server. The non controlling servers may even be inside of a customer's firewall. This connection is provided over communication path 4 (which may be one or many of the internal server memory, internet, Ethernet, or any other communication system that enables transmission of data between the sources $S_1$, $S_2$, $S_3$, $S_4$, $S_5$, $S_6$ (e.g., and up to $S_n$) and the central processor R1 R2 including land lines. The central processor (CP) has a two-way communication path (represented by two-way arrows) into a broadcasting system to the processors of contracted customers (C1 C2 C3 C4 C5 . . . Cn) indicated by line 8. This broadcasting, communication or data transmission system 8 may also be the Internet, Ethernet, wireless or land line system (or combination thereof). The data transmission to each of the customer processors (C1 C2 C3 C4 C5 . . . Cn) is based upon established contract parameters and analysis performed in the central processor R1 R2 with regard to the appropriate type of information to be provided to the customer processors (C1 C2 C3 C4 C5 . . . Cn) in accordance with contract terms and screening parameters performed by the central processor R1 R2.

In FIG. 1, it is shown only that Customer PC C1 is communicating with its local kiosks K1 K2 K3 K4 K5 K6 at various locations within the customer location. The customer may also have other business entities which may be located around the world which would be an additional customer location (C2-C . . . ), but controlled by a common master account. This enables systems wherein there may be one customer location or several customer locations with the same customer login, and which systems automatically accept portions of the feed from the central processor R1 R2 and may discriminate, filter, or receive supplemental content for the local area. For example, an X-Mart store may have 200 stores in 40 States. The n1 stores in New York City and suburbs will display the national content of the subscription and receive (directly or separately) local NYC content, or receive all local content and the software filters out everything that is not NYC local content (under that described or flagged category of feed) or accept only properly tagged or identified NYC local content. This type of feed to the entire customer locations would occur in each location or region, with the software allowing display of content consistent with the local contract and local needs. The communication is shown along what is likely to be a private communication line 14 at the customer location, but this may be a wireless or hard wire connection between the customer PC C1 and the various kiosks or displays K1 K2 K3 K4 K5 K6. Again, two-way communication is shown, but in this example that might be optional, with the only information likely to be fed from the displays or kiosks K1 K2 K3 K4 K5 K6 would be functional operation of the display, such as display issues, bulb failure, physical damage detected, malfunction detection, or alarm functions or video feed back from security cameras on the displays. The customers and viewers of the screen provided by the local users (e.g., Mall administration, central headquarters for specific stores, regional controllers for regional locations or stores, and the like) may also have user interaction (via keyboard, mouse or touch screen) that will feed back to the server (e.g., central processor R1 R2 through local customer PCs, e.g., C1) which will build on the capabilities for reporting performance and also to adjust the playback priorities, etc. The playback priorities would have to conform to the local contract or legal requirements, as where it would be allowable to broadcast a live game by a broadcaster, but that could not be rebroadcast without copyright issues.

In general, it will be clear to one of ordinary skill in the art to appreciate where two-way communication is optional, would have limited function or would be important or even critical to the system benefits and performance. For example, the two-way communication shown between the central computer R1 R2 and the customer computers (C1 C2 C3 C4 C5 . . . Cn) is essential. Over this communication line, contracts and contacts may be established and altered, feedback is provided, and fundamental communication of data is provided in both directions.

FIG. 2 shows a basic display of a kiosk sign or display, with various contracted data displayed, alone or along with locally provided information. In the sign display are shown five distinct forms/contents of data comprising from top-to-bottom, a locally provided announcement regarding a specific store and store event within the customer location (e.g., a shopping mall in California). The second line shown is a local health warning for the customer location that may have been originally provided (returning to FIG. 1 from S3, such as the National or State Weather bureau, along communication path 4 to the central processor R1 R2 and then evaluated as falling within the contract terms between the service provider and the local customer, and forwarded along communication path 8 to the local processor C1 for display at a particular kiosk. The third line shown is a local sports announcement for the customer location that may have been originally provided (returning to FIG. 1 from S4, such as the National Baseball League or local sports provider, along communication path 4 to the central processor R1 R2 and then evaluated as falling within the contract terms between the service provider and the local customer, and forwarded along communication path 8 to the local processor C1 for display at a particular kiosk.

The fourth line is a local paid announcement or public service announcement provided to the kiosk. One aspect of service may be that local organizations may submit information to the local customer directly or to the service provider (at the central processor R1 R2) so that this information may be appropriately displayed as an aspect of the general service of the provider and/or the customer. Such notices may be of lower commercial value priority to the customer, indicated by the relatively smaller font shown and the fact that these messages may be more transient and of shorter duration. This type of message treatment also constitutes an aspect in the practice of the present technology. For example, a section of the screen (e.g., a physical percentage, time percentage, location, color scheme of the display, etc.) may be dedicated to lower commercial value displays and controlled by the central processor and/or the local processor for the level of display, according to contract terms and/or according to identification or nomenclature provided with the provision of the information to the central processor R1 R2 and/or the local customer processor C1. This aspect will be discussed in greater detail later.

The fifth line on the display is a public service announcement health alert that is likely to be of local interest, as lots of products can often be traced locally. The nature of the content of the information is such that color and/or mode of display (e.g., flashing, font change, duration, position on the display) may be changed regularly or controlled for unique emphasis by the customer PC C1 or the central processor R1 R2.

The connecting communication line 4 may be local, national or international communications networks forming part of the Internet or dedicated connectivity such as satelite. On the communication line 4 are a limited number (e.g., subscribers, patrons, contributors) or unlimited number (the entire internet system) of sources of information, here shown as $S_1$, $S_2$, $S_3$, $S_4$, $S_5$, $S_6$ (e.g., and up to an unlimited $S_n$). The Internet serves to facilitate communication between and amongst the computing, communication, and display devices belonging to the system in the following manner. This feature may be optional on a dedicated server system that is placed inside of the customer's firewall. The system would still likely use Ethernet protocol in one form or another, but may not be the Internet.

Each of the sources of information may provide varied types of information to the central processor R1 R2 over the communication line 4 through the connecting line 4. For example, $S_3$ may be the National Weather Service, $S_1$ may be the Transportation Service Administration, $S_2$ may be the Center for Disease Control, $S_4$ may be the National Baseball League, $S_5$ may be the local, State or national Department of Transportation, $S_6$ may be the local or State Education Boards, etc. and any other source of information that provides any form of information that would be desirably displayed on a kiosk anywhere within the system, which might be any kiosk within a single country. All sources may be restricted within defined parameters or locals, or by subject matter information. The retrieval of information by the central processor may be based on alert information directed from the sources or by regular interrogation of the sources by the central processor R1 R2. That is, the information may reach the central processor R1 R2 by action initiated by the source (e.g., a change in a state, condition or event occurrence) that is known to be of interest to the central processor (by way of screening software, word-based prerequisites, subject matter content, predefined criteria, and the like) or upon inquiry from the central processor R1 R2 to the respective sources.

For example, there may be hundreds or thousands of web pages, images, sounds, and other variations of programming content, or any other piece of data that could potentially be presented at a given display device. It would take a large amount of memory and bandwidth to distribute and store the totality of content at each computer. Local, national or international communications network 4 enables a coupled computer or the central processor R1 R2 to check its sources to see if a particular information subject has changed and should be made available to a kiosk in a specific area or location, such as the mall, shopping center or local store. The computer can query its peers, e.g., the other computers coupled to communications network 4 through the internet for the relevant subject matter content and retrieve the content from the many available sources without the individual kiosk locations $k_1$, $k_2$, $k_3$, $k_4$, $k_5$, $k_6$, ... $k_n$, etc. having to individually provide a central computer, individually access the network, individually evaluate all information and somehow access the Internet through their own individual communications lines, shown by the two-way arrows.

A data gathering system within the central processor R1 R2 may be integrated or coupled to the central processor R1 R2 as an integrated or separate, but associated processor in the system. In general terms, a data gathering system may facilitate transmissions, transactions and/or may identify the potential audience located in front of or proximate the kiosks or the location of the kiosks and identify the type of information, the priority of the information, and the locals where that information is to be directed. Examples of data gathering system include weather analysis, temperature analysis, traffic analysis, transportation analysis, child abduction (e.g., Amber Alert), health alert analysis (e.g., epidemics, smog alerts, etc.), national alerts (e.g., terror alert, event alert, etc.) and the like.

FIG. 3 shows a basic plan of operation for the business elements of the system. Assuming that the central processor has been programmed with the functions that will be described herein, and the access to sources of information (CP system accesses source data) have been established from the central processor (e.g., by free internet access or by paid subscription), the provider, through the central processor will contact potential users and establish contracts with them for the automated provision of displayable data for the subscribers/users. A significant aspect of the contract will be to establish the specifics and ranges of the type of information to be provided to the users. For example, previous systems provided everything or a one-size-fits-all displayable information product to every user. This would mean that a sports stadium on the East Coast would be receiving the same information as a discount shopping outlet mall in Arizona, where the ultimate consumers have vastly divergent needs. The establishment of the contracted for information is therefore a significant step in the operation of the system.

A user/subscriber is either provided with a specific range of selections that the provider believes is appropriate or the user/subscriber picks from an essentially unlimited list of potential information desired. The provision of standard, but localized menus by the provider to the user/subscriber is a preferred method. In this format, the menu might provide choices from among at least one of the following and other potential information:

1. General weather in (select 10, 20, 50 mile radius)
2. Weather alerts in (select 10, 20, 50 mile radius)
3. National sports news
4. Local sports news (specific teams including MN Timberwolves, MN Twins, MN Wild, MN Vikings, UofM Football, UofM Basketball (Women's)...
5. National news
6. Local news relating to events in (10, 20, 50, 100 mile, or 5 state radius)
7. International news (may be ranked by basis of regional or national importance, such as reporting of Mexican election results in only the West and SW United States, Chicago, Washington, D.C. and New York) (The Olympics or other national or international sporting or election events would be a good example also)
8. News having a particular local interest (e.g., news relating to persons born in subscriber/user's local, within defined radius)
9. Information having relevance to particular display site (e.g., anchor store in mall announcing new credit rate, robbery at the mall, parade location at mall, etc.)
10. Regional job openings
11. Community calendar Once the contract parameters for information supply have been provided, additional conditions of information supply may be provided under contract of local control terms. By local control terms is meant that the provider can supply software that is downloaded by the local customer processors to perform certain functions. For example, certain information content would have priority with respect to the level of display. This can be provided by attaching code or nomenclature to the information that is treated by the central or local processor with respect to relative priority, and therefore displayed with respect to the relative priority in different fonts (e.g., larger, pulsed, colored) and for different lengths of time or frequency per hour based on the priority. For example, a national news bulletin on President's health might get a rating of A1, and be shown for 30 seconds of every 2 minute cycle of display time, while a notice of a continuing local transit strike in another city might be given a rating of D3 and be shown for 5 seconds in the two minute cycle of the display under the content of National News. Alternatively, A1 may be shown once per 2 minute loop while D3 may be shown once per hour.

The concept of the cycle display of information is of interest to the description of the present technology. Signage in earlier times was placed on billboards or other supports manually, and the information was changed infrequently, with a one-month minimum rental being typical. Similarly, gas stations would have manually adjustable signage for prices that would be changed manually. The advent of electronic image display has enabled more rapid image display change, but the potential use for such imagery has not been utilized. The practice of the presently described technology is intended to further that use. Not only may the images be changed more easily and more frequently, but also multiple images can be displayed on different portions of the screen, the images may have non-uniform periods of display, the images may have non-uniform dimensions of display, and the system may have feed from both distal and local sources with varying scope of information available from each source. For example, it has been common for a display to show temperatures, time, dates and an advertising interlude from the processor on the site, with the various information displays varying as the conditions are measured and the conditions change. The time interval and the space use for the different images tend to be fixed and equal. With electronic displays, it is clearly possible to vary the display format in ways not previously investigated, and also under control of a distal processor and commands (as taught in the present technology).

In the contract, formatting arrangement agreed upon by the customer and the provider, various elements of the display may be agreed to, and the imagery, information, and control provided to the displays under the control of the central processor. Examples of such formats and controls would be defining a cycling time or underlying time unit for the displays (e.g., 1 minute, 2 minute, 2.5 minutes, 5 minutes, 15 minutes, 1 hour, etc.) and assigning portions, percentages, or fixed periods for each displayed information element displayed on the kiosk. For example, over the lunch hour, a specific one hour information display period may be defined. Various food vendors in the area of the kiosk may purchase (through the mall customer or the provider) periods of time of that hour unit during which their menu or specials or general advertising is displayed. This is likely to be more under local control of the signage as opposed to control by the central processor, but the central processor may allot certain special areas of the kiosk for use by the local processor to assign during this time slot. As with any business enterprise, billing and invoicing is an element of the practice of the business. The billing may be based on some of the features already identified (such as content) and other bases of billing might include the time of day when the service is provided, based on the fact that internet and server usage varies with time or more people are viewing the signage at that time and location. Certain times would have certain bill rates, and the system may provide an Excel® software spread sheet or other format report specific to an advertiser with how much is owed. Also, the advertiser may specify a budget that would allow the system to auto-calculate when and how often to present their advertisement. The bill rate may also be adjusted if the local user allows incidental or peripheral advertising on the display, as is practiced on such sites as ebay or google, with an adwords type of system where an advertiser specifies the maximum amount that they are willing to pay per impression in a certain industry and location. For example, a drug company would pay more for a doctor's waiting room anywhere in the country where the local grocery store would pick only the Eau Claire, Wis. screens, and would pay more for waiting rooms where women frequented (perhaps a hair salon) than they would for an oil change center where fewer grocery shoppers are visiting. Of more import to the control system from the central processor would be an operating scenario where, frequency of updates under certain categories is contracted (e.g., stock market conditions on a 15 minute interval, half hour interval, or hour interval), frequency of cycling of immediate national news (e.g., 2 minute headlines every 15 minutes with 25% of the display area used, versus 2 minute headlines on the hour), tolerance level for interruption displays (e.g., special bulletins, level of importance attached to stories determining, under contract provisions, whether or not to display and interrupt particular items), priority of news items to be displayed (e.g., medium importance rated national news versus highly rated local news information), resources used in information provision (e.g., one rate may be charged for free sources accessed by the provider maintaining the central processor and a second rate charged to customers where the sources include sources for which the provider must pay a fee, such as sports networks), etc. The imagery may include live video feed, recorded video feed, live audio feed, recorded audio feed as well as photos and alphanumeric information feed for display on the kiosk screen.

Given the existence of an existing contract between the provider and user, with parameters of data provision established between them, and any desirable software provided by the provider to the user (either on-line transmission or by delivered software on a physical carrier such as disc or CD), and established sources of information between the provider and the sources, the operation of the system may begin. The following examples are to be considered exemplary and are not to be used to define the outer limits of the practice of the technology described herein.

Contract Terms

Provider will access and transmit (PWAT) data to user's local PC with a minimum of fifteen minute updates, or any other time frame that is designed or requested in the system on all requested information except for emergency weather conditions which shall be given a highest priority interrupt priority.

PWAT data relating to National news of priority B5 and higher with updates every half hour.

PWAT data relating to local news within a 100 mile radius of priority B1 and higher every with updates every half hour.

PWAT data relating to local sports news within a 100 mile radius and inclusive of information relating to the Green Bay Packers with priority C5 and higher with updates every hour.

PWAT data will be provided in a format that will be displayed on no more than 75% of available screen surface, with local provided image display controlled by user in segments 7-10 of the display screen format.

Time of display for units within fields will be based upon established priority treatment (EPT) criteria in provider software.

Based upon these contract provisions, the software will operate to provide the service to this particular customer, evaluating received source data under the guidelines of the contract. EPT treatment may operate as follows. Each item of information will be delivered from the source with a given priority value or a priority value will be added by the provider. The priority may vary according to ultimate local. For example, a National health alert or International health alert will have an A1 priority value, the highest level possible. A hurricane alert for the Gulf States would have an A1 alert or priority value for the Gulf States, but a low priority value of C1, for example, in Alaska. Major stock market vents might have a priority value of A5 within the United States, and a value of B2 in Canada. A is the highest priority value (or any other identifier) and increasing numbers (or other series of secondary identifiers) indicate lower priority values. Single alphanumeric identifiers may also be used for identifying priority.

The EPT software may take these relatively assigned priority values (which may be generic to the display surface or specific to limited areas of the display screen, as shown in FIG. 2) and by an algorithm distribute the display time and/or size or mode of the display to each of the information items received based upon the assigned priority value. For example, operation of the algorithm in the software may operate as follows on the identified received priority data.

DATA RECEIVED

1) Local Health Alert—Smog-air quality—Priority A1
2) Stock Market Alert—Single Stock collapse—Priority B3
3) Local Election Event—Candidacy announcement Mayor—Priority B1
4) Local Sports News—Mid-level sports figure retires—Priority C1

DATA OPERATION

Hour time period for refreshment
News Display on 30% of viewable screen

SOFTWARE (EPT) OPERATION

Item 1 assigned 40% of total time allotment, plus color enhancement with pulsing to be displayed with no more than two consecutive other times.

Item 2 assigned 25% of total time allotment with normal font.

Item 3 assigned 20% of total time allotment with normal font.

Item 4 assigned 15% of total time allotment with sports notice bullet (e.g., football symbol) heading notice.

The entire display of the information in the distally assigned and controlled space on the kiosk (as opposed to or in combination with reserved kiosk space or time for traditional advertising or notices) is controlled by software provided by the provider, either through its own controlled services or through its controlled service in combination with the local control (which may be with provider supplied software or standard web browser setup) and is automatically displayed under the levels, terms, parameters and guideline of the contract.

A typical step process for operation of the software on received data to be displayed from the central processor might be described as follows:

1. Central processor sends data to one or more contract clients.
   a) sent data is either generally broadcast or sent to individual clients as unique data set.
2. Local processor of contract clients receives data with identified priority attached thereto or has software application or manual input at local processor that assigns priority or only assigned priority elements are sent to each customer according to their contract.
3. Software identifies priority content of received data and determines apportionment of time/display space for data based on priority evaluation.
4. Content distributed among local kiosk displays based on apportionment.
5. Local processor may add local (non-service provided) image, video, audio or text content to the display typical under the direction of the service based on the contract rules.
6. Central processor updates transmitted information/image data on contract term basis, including emergency broadcast.

The entire functional system for performance of the automated signage system of the described technology may minimally include the processors or data producing sources of information, the internet or communication path 4 (which may be the same or different from the information paths 8 and 14) earlier discussed, the central computer R1 R2 that receives the source data and treats, rates or transmits the data. The central computer R1 R2 also serves as a place where the user logs in to set up the "rules" for playback and changes the contract, for example, buys additional capabilities. The data, preferably with ratings imposed on information items transmitted either generally or to unique client profiles (when broadcast generally, software downloaded to the user's local processor can discriminate or filter information items according to contract terms embedded within the downloaded software or at the central processor server). The system may also comprise the computer systems of client's processor, program server computer at the local user's site, digital signage server and digital signage memory at one or more locations in the information flow path, input devices (e.g., keyboard, joy sticks, touch screen and pointing devices, sensory devices, personal identification devices, etc.), output devices (e.g., displays, directional speakers, printers for coupon printing, etc.), and storage devices (e.g., memory, disk drives, etc.). The memory and storage devices are computer-readable media that may contain instructions that implement the facility.

The actual signage environment is basically any location wherein signage provides a use desired by the location user, such as a sports arena, school, shopping mall, road sign, restaurant, cafeteria, swimming pools, and is not intended to suggest any limitation as to the scope of use or functionality of the facility. Other well-known computing systems, environments, and configurations that may be suitable for use include client computers, server computers, hand-held or laptop devices, cell phones, PDA, multiprocessor systems, microprocessor-based systems, programmable consumer electronics, network PCs, minicomputers, mainframe computers, distributed computing environments including any of the above systems or devices, and the like.

The facility may be described in the general context of computer-readable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

In most embodiments of the invention there may be a public network that comprises the Internet. Because security threats typically reside in the public network a software and/or hardware device called a firewall is placed along the connection point between the Internet and one or more of the associated receivers of information transmitted to other processors, whether in a public or private network. A server may be placed inside of the firewall, and that server may communicate only to the central processor for license or other information. The firewall may be provided by the provider and blocks all traffic between parties, whether from the public network to the private network or between private networks except for predefined types of messaging traffic such as web access to a defined set of web servers. The portion of the system including the firewall typically is referred to as the DMZ because the resources it contains are only partially protected from outside access. In certain embodiments of the invention another firewall is placed between the DMZ and the private (strictly internal) network. This second firewall allows access to the internal network only from machines in the DMZ utilizing a specific predefined type(s) of messaging traffic.

Static data to be served by the system can be placed in either the internal network or in the DMZ. Typically the static data is placed in the DMZ since it is often directly attached to the web servers. In the described system, however, the static data may be stored on a Network Attached Storage (NAS) which resides in the private network zone. An advantage of NAS is that the storage has its own network address and hence the disks can be shared efficiently across multiple computers and is highly scalable. Static data may include, but is not limited to, content served that is of interest to consumers generally or at specific times, information and instructions, standard page formats into which individualized data, information and charts can be inserted, and the like.

Dynamic content (e.g., user-specific information) may also be stored in the NAS. However, because dynamic content is likely to be managed using a Database Management System (DBMS) such as Oracle or SQL, a server system may employ a separate DBMS server for dynamic content. Use of a separate DBMS server for dynamic content may also be necessary due to the processing requirements involved in the manipulation of data in the system and to further support database scalability. In most embodiments of the described technology, the public network will comprise the Internet, although dedicated networks, landlines, wireless or the like may be provided to individual users that are within or outside of their private DMZ.

The practice of the technology has been fully and generically enabled to one of ordinary skill in the art by the descriptions provided above, and the following additional descriptions show alternative ways of describing this technology.

A method of providing signage information to a viewable display may be practiced by a central processor system communicating with multiple information sources; the multiple information sources providing information to the central processor system; the central processor system distinguishing among information according to categories of information received; the central processor forwarding information on a periodic or continuous basis to client processing systems; and the client processing systems providing information to at least one display system for display. In this method, the information forwarded is less than all information provided from the multiple information sources and determination of the amount of information and type of information forwarded is determined by at least one software program agreed to by the central processor system and the client processor system. The user may have additional options that are generally or specifically controlled by the user or the contract (and therefore the central processor R1 R2). For example, the user may have input on the type of information that will be delivered to their screens also.

The method may have information forwarded on the basis of a priority format established between the central processor system and the client processor system. This established format may be agreed to in a written agreement or transmitted electronic agreement that is implemented in software and executed according to software provided by the provider. The method may have the central processor assign priority classifications to information received. The method may have the priorities based at least in part upon an evaluation of the relationship of received information to client location. The method may have software automatically assisting in determining time duration for display of information, frequency of displayed information items and/or space allotment to information items to be displayed. The method may be performed wherein prior to providing information to the client processing system, content parameters for the information transmitted are formally agreed to between the central processor and the client processing system and information is provided according to parameters, conditions and/or terms of an agreement implemented in software in the central processor. The method may have the agreement includes payment for information received, an amount of the payment based upon contract provisions between the central processor and the client processing system. Payment, as previous noted, may be based upon information content and/or information sources used, as well as frequency of updates. A system may be used for providing controlled information for display by a client comprising an information communication network allowing transmission of information between processors; multiple information sources that communicate information over the information communication network; a central processor that receives communicated information from the multiple information sources; the central processor categorizing received information; the central processor providing categorized information over the network; a client processor that receives categorized information and displays categorized information that is provided according to parameters established between the central processor system and the client processor system which limits the type and content of information that may be displayed according to software executed in the central processor or the client processor.

There are additional formats for the use and practice of the technology described herein that fall within the generically described concepts.

Gathering the Information from the Information Sources (and How it is Stored):

Whenever there is a request (either automated or client initiated) from a client or a server for information (perhaps the weather for zip code 54701), the request may be processed directly, indirectly or stored into a database or file to be processed in the future by one of the servers in the network. An automatic or personally supervised analysis of the compliance with a contract (e.g., service contract, scope of information contract, periods of variation of information, etc.) should be performed to assure that information beyond the scope of agreement is not being provided. The type of data to retrieve (i.e., weather) and additional information that identifies the specific information to gather (zip code and country) is stored in this file. Depending on how heavily the system is used and the scope of information requested under this category, there may be requests for hundreds of pieces of information which are stored before the information is gathered. One or more servers have responsibility to gather information at certain periods. Typically, this process is started once a minute. However, the process could be running constantly to provide fast feedback. The process will read each "request" record that has been issued and delete it so that other data gathering servers will not re-process the record.

There may be a database of details for each type of information to be gathered. The database may contain several things including the class and subclass of information which determines the program code to execute to display the information to the client, a cache category and subcategory for storage into the cache database (regularly updated from the originating sources), various sets of user setup information, the web site or xml feed address to read from, a series of commands to obtain the appropriate information that needs to be stored for use by the system. It may also contain information about how often that the system should gather information and the times and days of the week that the information sources update their content.

When the "request" record has been read by the data gathering server, it may look at a "style" database and finds the appropriate record with which or from which to respond or read. The data gathering server looks at the previously read information to see if the information is old and needs to be refreshed. If it does, the server gathers new information from the information source. After the information has been read, it may be processed through the series of commands that may be stored in the style record or program code. The new information is stored (perhaps by updating the cache record). This process is repeated until all records have been handled.

Transmitting Information Between the Servers is Performed:

Servers can synchronize each other in several ways. The most basic way is to transmit a full backup on a nightly basis. The system also does updates either immediately (approximately continually, but there are limitations on the purity of the continuity) or on a periodic (e.g., per minute) basis by a separate (or the same) synchronizing server. Transfers are typically started with a Cron (or other automated scheduling program) to start a program on the server (or on a standalone pc that is trusted by the server network). The program is configured to send and/or receive information to/from one or more servers. The information may be a complete database, one database record or one or more files (such as a graphic image or archived group of data files). The program can either put the information into a database that is accessible from the other servers, or it can call a web based program on the other server with an encrypted parameter that says what to do and which file to retrieve from the original server. The calling may be done by issuing a file read command. The remote program reads the file (or files) from the specified location, does what it was told to do, and stores the resulting data to the configured (or server specified) location. When the process is complete (or if it fails), a result code will be returned and read by the initiating server and stops the process. When using the html file transfer system, the initiating server will always send the information to the other server since the other server can only read files from the initiating server (it cannot write to it). Reading and writing of files can be done with this process by using the information read process to instruct the other server become an initiating server.

Distributing Tasks to Other Servers is Performed:

Tasks are typically pre-defined in the system for each server. The server may run the task constantly, have a schedule to run background processes for the task to be done, or the server may create html web code with the appropriate server being specified for various tasks. For example, a Unix data gathering server(s) can be set up to process information with a cron job. The background data requests may be called using the above system to a data gathering server which may store the data request record. An image sending server may have all references to images on a web page point to an image server. The login server url may point to a login server. The first server that the customer reaches may look at the load of all the servers and point all future requests to a less used server.

Categorizing the Information is Done:

Categorizing the information within a server or processor may use the page setup that the customer configures, the database information that they create, the information from external information sources, the current date and time for the customer's area or anything else that is available to the server to categorize and prioritize the information and the information playback. The categorization can be done by any selected and useful basis of categorizing the data according to a standard or reference point (geographic or any other relationship) such as distance from latitude and longitude, time of day, day of the week, holiday dates, temperature, light or dark outside (day or night), particular meal times, business hours of operation, weather and many other potential categorizations. The selection criteria may include an increment before and after the actual "trigger" to allow for a smoother operating system and to allow a wider audience to see the information.

The Information is Sent to the Client:

The information transmission may be started at the client with a program that is often downloaded (either directly or transparently by a web site) from one of the local or remote servers in the system. When the program is started (usually on the startup of the computer or activation of an appropriate web page using the system), it may first look for a local initial settings file and any parameters that were passed to the startup program. This information may also be branded into the program before the client downloads the program. If one and/or both of these settings or parameters are found, they are read and initial settings (which may include the initial location to read additional information) are configured based on that information. If no initial location was found, it assumes that the initial location to read information is the server or storage location that it was loaded from.

Sending Information from the Client to the Server is Performed

The system may then make a read request with some of the initial settings passed as parameters to read the configuration file from the initial location. The parameters may be encrypted which will be analyzed and unencrypted on the server to help prevent unauthorized use of the system. The server may use the parameters to determine what version of file transmission the client is expecting to see, which client signage content should be used, the settings that the customer had previously configured which the server stored or determine default background, text, size or other information which could include hours of operation. It may look at the utilization of all servers in the system to create a list of servers that should be accessed as primary, secondary, etc order. Since this may be requested of a publicly accessible web server, it may also have version information, security information and encryption keys to ensure that only authorized programs are retrieving the information. The result is returned to the client in a format that the client recognizes—which may be standard text, xml, html or a special format that maintains the security of the customer's data throughout the storage, communication and display process. If an error occurs (or other information is detected that the client may want the server to know), the client may send the information to the server through a process of reading from the server with a parameter that includes a special flag that the server knows with the information the client wishes to send. For example, if an error message needs to be transmitted to the server to notify the administrator, the flag could be "error" with an additional parameter of the message to display. The client may send information to the server to log or email error messages, change the server's future categorizing of information either from a user request by someone viewing the screen either by touching an area on the screen, clicking a mouse, typing keystrokes, information received from another hardware device that is connected to the client computer, etc. Sending may also be done to give the server confirmation that a designated task was properly completed, such as confirmation that a command to turn off the screen had successfully completed. For example, if the client from Hollywood, Fla. identifies that the data provided is from Hollywood, Calif., or if temperatures are being reported in Celsius degrees rather than the requested Fahrenheit degrees, the nature of the error is sent to the server. The server could also be configured to adjust future transmissions in Fahrenheit based on this information.

The client receives this information, may decrypt the information and validates authenticity (if necessary), and normally sets up the default settings for the user. Any of these defaults (including servers) can be set to different values at a later time. If the server has sent down a list of servers to use, the client system may switch to a multi-server mode for all communication. In this mode, if a transfer fails to communicate from one server due to slow response, server failure, Internet connection problems or other things that would cause communication failure, the transfer request is resubmitted to the next server on the list. If all servers fail, the system waits a pre-configured period of time (normally sent down in the configuration settings when the system was started) and restarts the transfer sequence with the first server. A program may automatically discount charges to a client based upon such down time, and the discounts may be based upon the value of the specific time when the system is down, such that higher value display time (e.g., 11:00 a.m. to 2:00 p.m.) allows for a higher discount to the client's charges than would a less valuable time slot (e.g., 10:00 p.m. to midnight). Once the initial configuration settings are loaded, any images, backgrounds or other commonly used information may be pre-loaded in the background with the first used ones being loaded first. Once enough initialization information has been loaded to start the display, the task of loading information to display begins. A read request is made of the servers for the next page of information for the proper client account. The server looks at a variety of information which could include the parameter information, all the various categorization information that it has available for that account and selects the next page to be displayed. A header information record is normally sent from the server to the client which may tell the type of information that will be displayed along with additional information that may be necessary to fully load the information to display. The client may create a storage area for the information and does any additional loading of files or information that may be necessary. For example, a text paragraph will probably send the font attributes, orientation, location and text to display in the header, which is all the information needed to "build" the page to the storage location. The current weather may require an additional template and program code to be loaded and specific images to show a visual representation of "sunny". These will normally be loaded from the server pool or another data source before the page can be fully built. Once the page is loaded and built, it is displayed for the timeout period specified by the server (using the default timeout or specific timeout sent in the header). While it is being displayed, the client may have the capability to preload other pages. When the timeout is reached, if the next page is loaded and properly built, it will be displayed on the screen. Any transition effect such as cut, dissolve, slide left, push left, spiral, etc. may be programmatically implemented to enhance the impact to the viewer of the screen as it transitions from showing the currently displayed page to the new one.

If the next page is not loaded and built, the system may automatically check the other storage locations for a properly built page. It will transition between those assembled pages to make the system look active. If no pages are built, the system will either display a message on the screen, to the server or simply leave the currently displaying page there until a new page is properly built.

The system can be stopped several ways. An automatic shutdown can be done to allow refreshing the client program. The system may be configured to shutdown the system by pressing a specific key or series of keys, clicking on a proper spot with the mouse or touching the appropriate spot on the screen. The client may have the ability to notify the server that the display was properly shut down by sending the server a shutdown command. The server may load a replacement web page to the client that contains a command to close the web page window.

The server may have the capability to notify the administrator of the client computer when the display is not getting updated when it sees no file reading activity from the client that has not been properly shut down.

As noted within the description of this technology, many variations within the generic theme of the technology are available to those skilled in the art, including not only the variations specifically identified, but also those equivalents and alternatives that are known in the art for any of apparatus, software, image display format, imaging apparatus, information transmission formats and pathways, and the like. These alternatives are to be considered in the interpretation of the claims.

What is claimed:

1. A method of providing signage information to a viewable display comprising:
   a central processor system communicating with multiple information sources;
   the multiple information sources providing information to the central processor system;
   the central processor system distinguishing among information according to categories of information received;
   the central processor forwarding information on a periodic or continuous basis to client processing systems; and
   the client processing systems providing information to at least one display system for display;
   wherein the information forwarded is less than all information provided from the multiple information sources and determination of the amount of information and type of information forwarded is determined by at least one software program agreed to by the central processor system and the client processor system;
   wherein the central processor assigns priority classifications to information received;
   wherein the priorities are based at least in part upon an evaluation of a relationship of received information to and from a client location.

2. The method of claim 1 wherein the client processor system specifies content of what is displayed.

3. The method of claim 1 wherein information is forwarded on the basis of a priority format established between the central processor system and the client processor system.

4. The method of claim 1 wherein software automatically assists in determining time duration for display of information, frequency of displayed information items and/or space allotment to information items to be displayed.

5. The method of claim 1 wherein prior to providing information to the client processing system, content parameters for the information transmitted are formally agreed to between the central processor and the client processing system and information is provided according to parameters, conditions and/or terms of an agreement implemented in software in the central processor.

6. The method of claim 5 wherein the agreement includes payment for information received, an amount of the payment based upon contract provisions between the central processor and the client processing system.

7. The method of claim 6 wherein the client elects parameters of what is to be displayed on client displays.

8. A system for providing controlled information for display by a client comprising an information communication network allowing transmission of information between processors;

multiple information sources that communicate information over the information communication network;

a central processor that receives communicated information from the multiple information sources;

the central processor having the capability of distributing tasks to other servers within a central processor group;

the central processor categorizing received information;

the central processor providing categorized information over the network; and a client processor that receives categorized information and displays categorized information that is provided according to parameters established between the central processor system and the client processor system which limits the type and content of information that may be displayed according to software executed in the central processor or the client processor;

wherein the central processor assigns priority classifications to information received;

wherein the priorities are based at least in part upon an evaluation of a relationship of received information to and from a client location.

9. The system of claim 8 wherein at a single client location there are multiple display systems wherein information from the client processor is uniformly displayed on the multiple display systems.

10. The system of claim 8 wherein at a single client location there are multiple display systems wherein information from the client processor is differentially displayed among the multiple display systems based upon direction effected by the client processor.

11. The system of claim 8 wherein software in the client processor automatically assists in determining time duration for display of information, frequency of displayed information items and/or space allotment to information items to be displayed.

12. The system of claim 9 wherein software in the client processor automatically assists in determining time duration for display of information, frequency of displayed information items and/or space allotment to information items to be displayed.

13. The system of claim 10 wherein software in the client processor automatically assists in determining time duration for display of information, frequency of displayed information items and/or space allotment to information items to be displayed.

14. The system of claim 8 wherein software in the central processor automatically assists in determining time duration for display of information, frequency of displayed information items and/or space allotment to information items to be displayed.

15. The system of claim 9 wherein software in the central processor automatically assists in determining time duration for display of information, frequency of displayed information items and/or space allotment to information items to be displayed.

16. The system of claim 10 wherein software in the central processor automatically assists in determining time duration for display of information, frequency of displayed information items and/or space allotment to information items to be displayed.

* * * * *